Feb. 16, 1971  R. L. LINCOLN ET AL  3,564,570
GAS-SOLIDS SEPARATOR

Filed March 8, 1968  3 Sheets-Sheet 1

INVENTORS
ROLAND L. LINCOLN,
FRANK G. MILLER, JR.,
WALTER C. GOTHE

BY Jack L. Prather
ATTORNEY

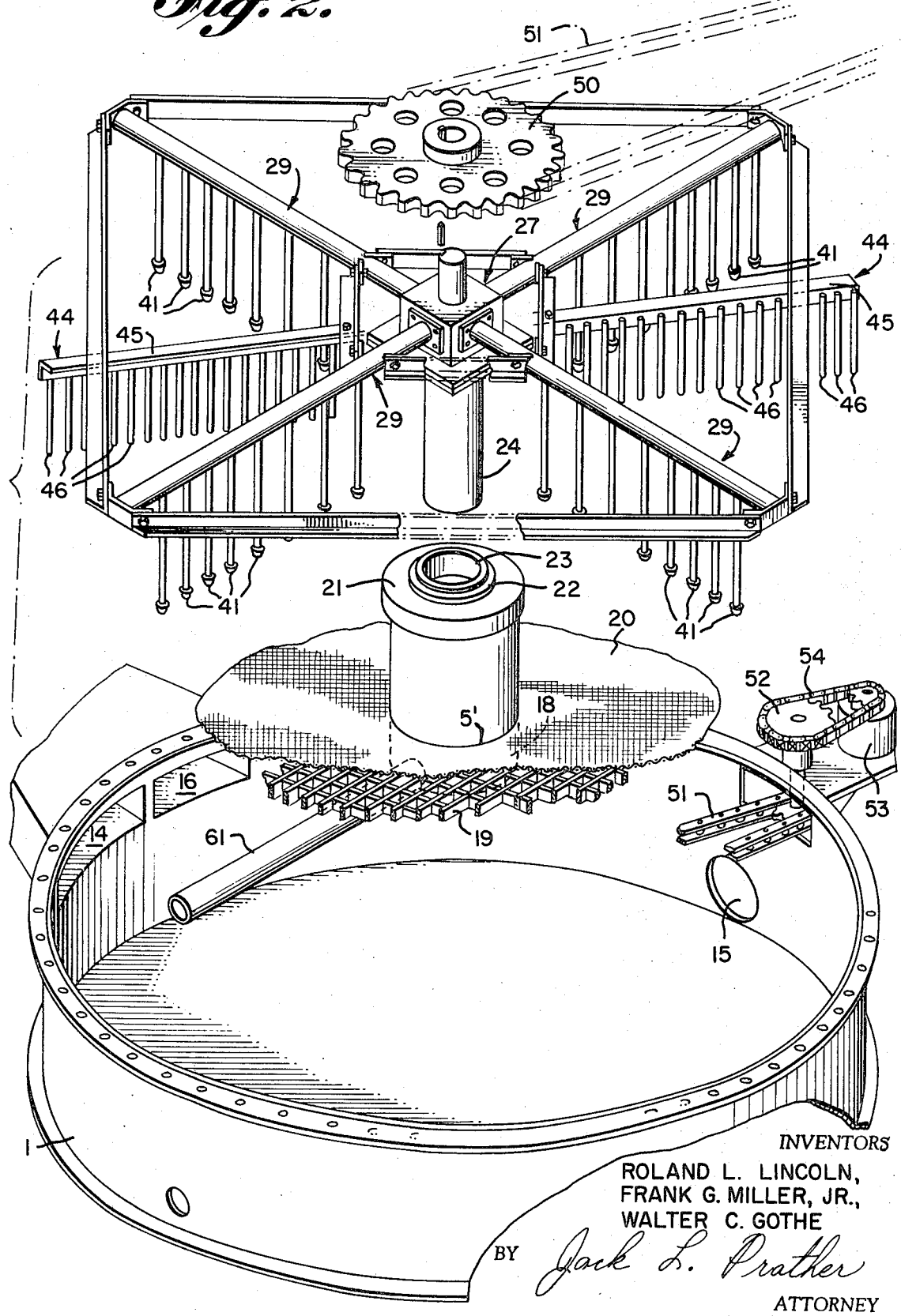

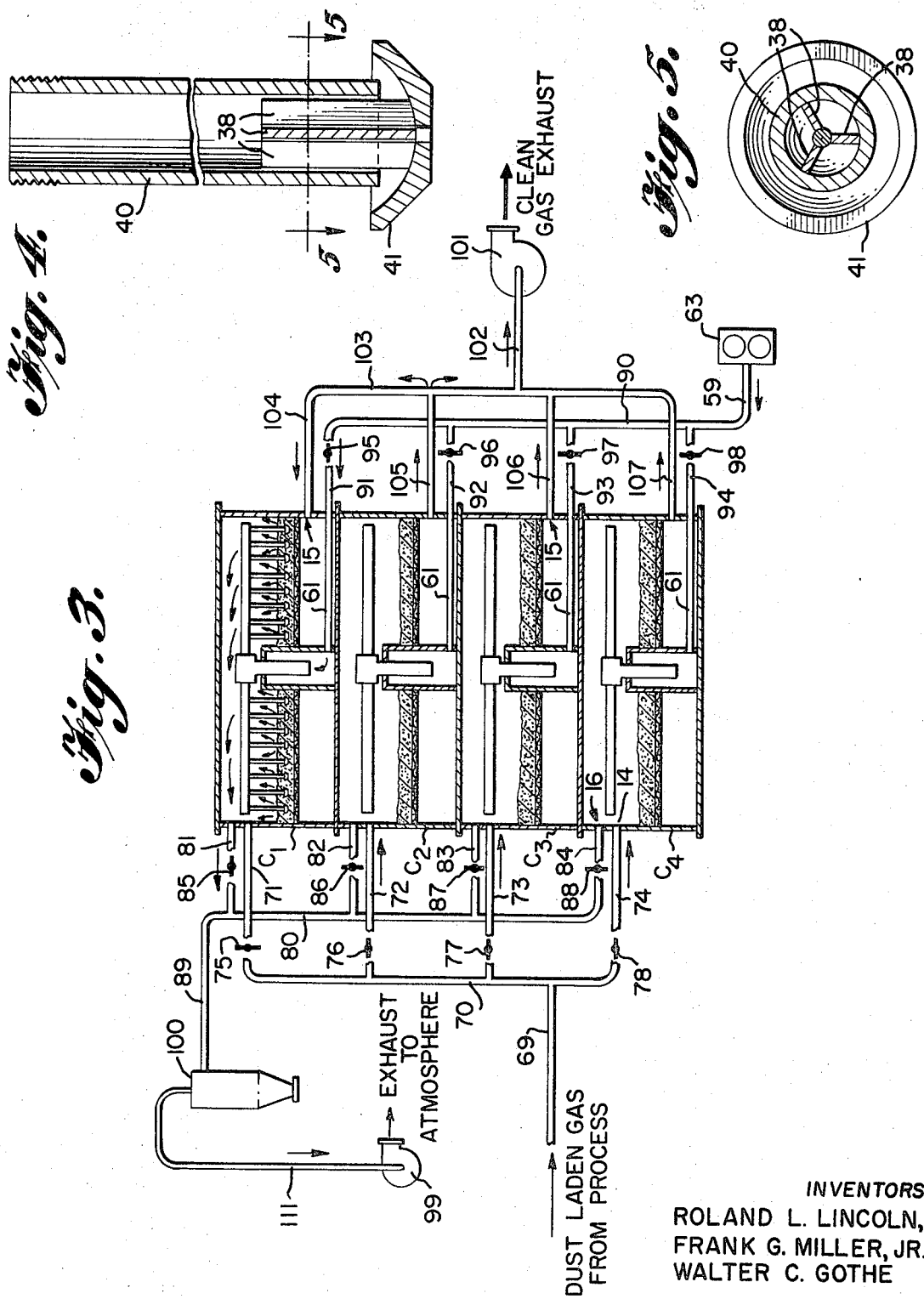

United States Patent Office 3,564,570
Patented Feb. 16, 1971

3,564,570
GAS-SOLIDS SEPARATOR
Roland L. Lincoln, Macungie, Frank G. Miller Jr., Bethlehem, and Walter C. Gothe, Macungie, Pa., assignors to Fuller Company, a corporation of Delaware
Filed Mar. 8, 1968, Ser. No. 711,652
Int. Cl. B01d 46/36
U.S. Cl. 55—286                    14 Claims

ABSTRACT OF THE DISCLOSURE

A dust collecting and filter cleaning apparatus having a filter media consisting of a bed of granular material for removing dust from dust laden gases passing therethrough. When the bed becomes loaded with dust deposits, the flow of dust laden gas is interrupted and a reverse flow of clean gas is passed up through the entire bed area for fluidizing the granular bed and simultaneously compressed air pipes are moved through the granular bed to produce rapid agitation of localized areas of the bed to liberate the deposited dust particles which are conveyed out of the apparatus with the reverse clean gas flow.

BACKGROUND OF THE INVENTION

The present invention relates to the separation of particulate solids and contaminants from gases and is concerned more particularly with the filtering of gases through a granular filter medium and the efficient purging of the deposited particulate solids and contaminants from the filter medium.

Dust laden gas passes downward through the filter bed depositing its entrained particulate solids and other contaminants on or within the bed. When the bed becomes loaded with the collected solids and contaminants, the resistance to flow through the bed increases and it is necessary to clean the filter bed by removal of the deposited particulate solids and other contaminants.

Prior granular bed filters are known and include variations between vertical beds and horizontal beds. However, they have not been found entirely satisfactory, particularly regarding the removal of the collected solids and contaminants from the filter material. This typically involved the discharge, bulk handling, cleaning and recycling of the granular filtering material before the material could resume filtering duty. Prior attempts have been made to clean the filter bed in situ but have proved unsuccessful also. These attempts have usually involved some means of back flow of clean gas through the bed, however, due to the compaction of the filter bed and stickiness of the collected matter, the efficiency of the filter cleaning has not been satisfactory. Inefficient filter cleaning results in a rapid build up in pressure drop across the bed thus necessitating more frequent cleaning of the bed and/or replacement of the filter material.

The present invention provides for the cleaning of granular filter beds in situ without rehandling and with maximum retention of on-stream bed area. The apparatus of the present invention may be constructed from metal with a filter media of sand or other suitable granular material so that the temperature limit of the present invention essentially is the temperature limit of the metal, for example, approximaely 750° F. for mild steel.

SUMMARY

The preferred form of the present invention comprises a plurality of filter chambers each having an inlet for dirty gas and an outlet for cleaned gas with a substantially horizontal bed of granular filter material mounted in the filter chamber and interposed between the inlet and outlet. A purging gas outlet is provided on the dirty gas inlet side of the filter chamber for removal of particulate solids and contaminants. The purging gas outlet communicates via a conduit with a reverse air fan which produces a reverse air flow for fluidizing the granular filter bed and assists in the removal of particulate solids and contaminants from the filter chamber.

A rotatable hollow hub is mounted on a rotatable hollow sleeve bearing which extends through the horizontal filter bed and communicates at its bottom end with a compressed air conduit which receives compressed air from a suitable source. A plurality of jet manifold assemblies are connected to the rotatable hub and radiate outwardly therefrom along the upper surface of the filter bed. The jet manifold assemblies receive compressed air from the compressed air conduit. Each manifold assembly has a plurality of hollow jet air tubes extending downwardly therefrom into the granular filter bed. Deflection cups are fastened on the bottom of the tubes so that compressed air discharging from the tubes will be deflected upwardly and outwardly into the bed material. The hub is rotated by means of a suitable drive means. A rotatable rake assembly is connected to the hub in following relationship to the jet manifold assemblies for leveling the bed.

During the bed cleaning phase, the reverse air fan produces a reverse flow of clean gas upward through the bed sufficient in magnitude to fluidize the granular filter material in preparation for purging. Simultaneous with the reverse flow of air, the hub is rotated and compressed air is supplied to the jet air tubes. The compressed air escapes and causes a rapid localized agitation or "boiling" of the granular filter material to free the collected particulate solids and contaminants therefrom for removal through the purging gas outlet.

This dual air flow cleaning principle overcomes the filter cleaning problems encountered in prior gas-solids separators of this general type. A single upward flow of cleaning gas over a full bed area at a velocity sufficient to violently agitate or "boil" the granular material to clean the bed would be subject to unbalance. The first small area to "boil" will cause a short circuiting of the reverse gas flow due to reduced bed resistance and therefore allow a very large quantity of the reverse gas flow to pass through this first small area. This will, of course, interfere with the cleaning of the remainder of the bed. By first fluidizing the entire bed area to a degree of fluidization less than the "boiling" or "blowing" point we are able to expand the bed and loosen the compacted granular filter bed. This loosening of the bed places it in condition for localized cleaning action. The individual particles of the filter bed while in a fluid state may be rapidly agitated to free the accumulated dust particles and contaminants. The rapid agitation is localized and is accomplished by the rotating hub assembly thus preventing short circuiting through a single small area of the bed.

A better understanding of the invention and its advantages may be derived from the following description and the accompanying drawings in which:

FIG. 2 is an isometric exploded view of a filter chamber;

FIG. 3 is a schematic view of an assembly of a plurality of filter chambers showing the flow arrangement through the system;

FIG. 4 illustrates the details of the deflection cup assembly; and

FIG. 5 is a sectional view taken along line 5—5 of FIG. 4.

DESCRIPTION OF THE PREFERRED EMBODIMENT

Figure 1:
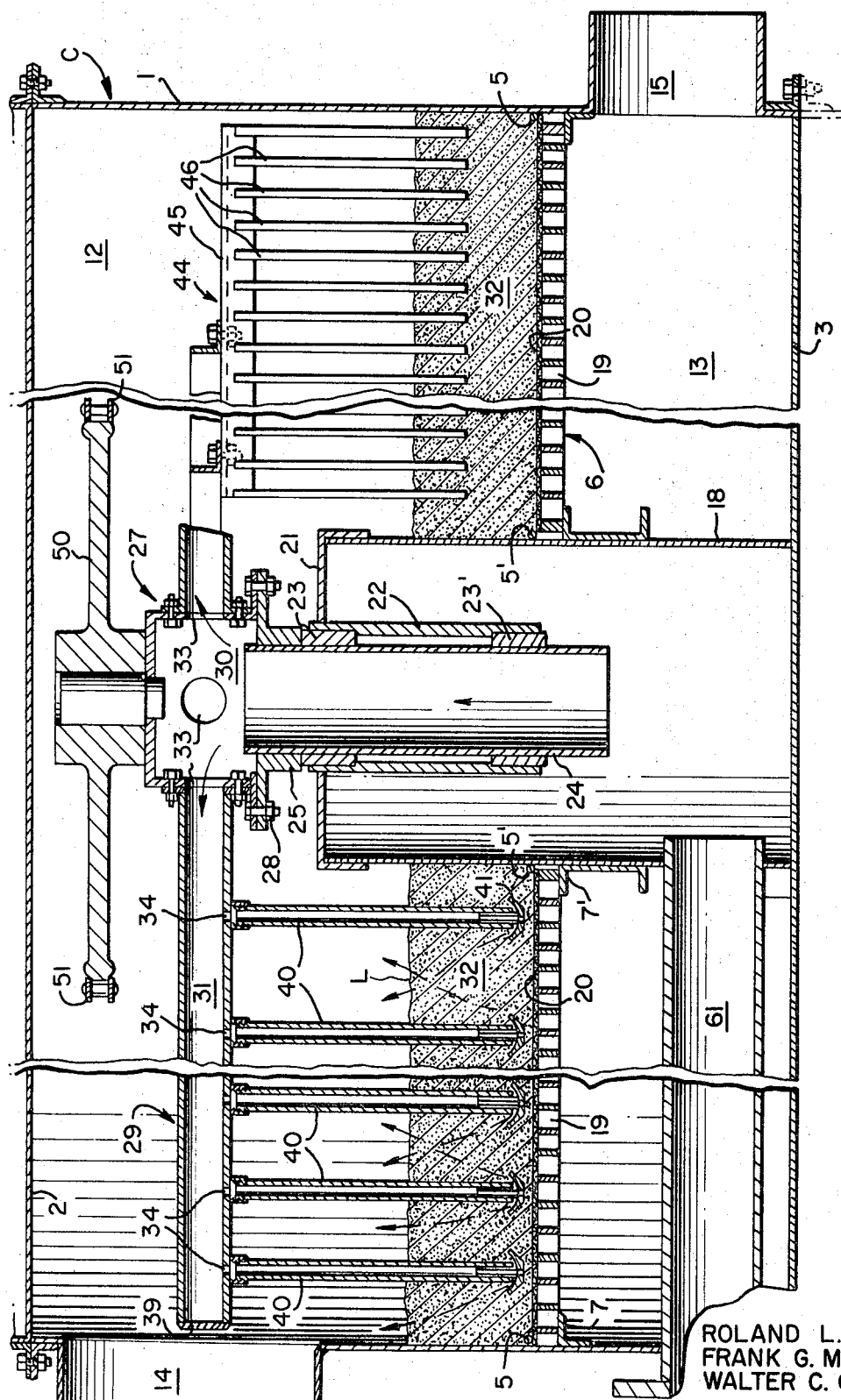
FIG. 1 is a partial, broken sectional view through a single filter chamber.

The preferred form of the present invention comprises a basic gas-solids separator which is adaptable for use as a single unit separator but which in its preferred form consists of a plurality of units combined either in series or parallel depending upon the intended use.

As can be seen more clearly in FIG. 1, a single unit separator consists of a vertically disposed cylindrical casing 1 forming the side walls of an enclosed cylindrical filter chamber C. The chamber is closed at its top with a cover plate 2 and at its bottom with a bottom plate 3. The cylindrical chamber is divided into an upper, dirty-gas inlet compartment 12 and a lower, cleaned-gas outlet compartment 13 by an annular, gas-permeable bed support wall 6 which is held in place in the chamber by support members 7 and 7'. The support wall 6 preferably comprises a coarsely-perforated support plate or grating 19 with a thin, finely-perforated sheet or screen 20 overlaying the support plate to retain granular filler material. The screen 20 is held in place by means of retaining rings 5 and 5'.

A gas inlet 14 is provided in the wall of the cylindrical casing 1 for admitting dirty gas to the inlet compartment 12 above the granular filter bed and a gas outlet 15 is provided in the wall of casing 1 for discharging cleaned gas from the outlet compartment 13 beneath the granular bed. A purge gas outlet 16 is provided in the wall of the cylindrical casing 1 adjacent the gas inlet 14 for discharging particulate solids and contaminants which have been liberated from the granular filter bed.

A rigid cylindrical casing 18 is sealably connected at its one end to the bottom plate 3 and extends vertically upward therefrom and through an opening in the center of the support wall 6. The casing 18 is covered at its other end by a cap member 21. The cap member 21 supports a bearing assembly consisting of a sleeve member 22 which extends through a circular opening in the cap member 21 and downwardly therefrom into the casing 18. Hollow radial bearings 23 and 23' are secured on the inside of the sleeve member 22. Extending through these radial bearings 23 and 23' is a rotatable hollow sleeve bearing member 24. Rigidly fastened around the upper periphery of the rotatable sleeve bearing 24 is a thrust bearing member 25 which slidably engages the radial bearing 23.

A hub assembly 27 is mounted over the upper end of the hollow sleeve bearing 24 and is connected to the thrust bearing 25 by suitable fastening means such as bolts 28. The hub assembly 27 encloses a plenum chamber 30 which communicates with the interior of the casing 18 via the hollow sleeve bearing 24.

A plurality of jet manifold assemblies 29 are connected to the hub assembly 27 and radiate outwardly therefrom in parallel relation to the upper surface L of a granular filter bed 32. These jet manifold assemblies extend substantially the full radius of the bed. Each jet manifold assembly consists of a pipe member 31 connected to the hub assembly 27 and extending horizontally therefrom along the upper surface of the bed. The pipe members 31 communicate with the plenum chamber 30 via openings 33 in the hub assembly 27. The other end of the pipe member is closed by a pipe cap 39. The pipe member is provided with a plurality of orifices 34 which are uniformly positoned along substantially its entire length.

Connected to the pipe member 31 at each orifice 34, and extending downwardly therefrom are a plurality of hollow jet tubes 40. Thus, the jet tubes are positioned along substantially the full extent of the filter bed. The jet tubes 40 communicate with the interior of the pipe member 31 via the orifices 34. The jet tubes extend downwardly into the granular filter bed 32 and terminate adjacent the upper surface of the bed support wall 6. A deflection cup 41 is connected to the lower end of each of the jet tubes 40. The deflection cup has a plurality of ribs 38 extending upward from the inside of the cup. The ribs extend into the end of the jet tube and frictionally engage the interior of the tube. This arrangement permits compressed air to flow through the jet tube and around the ribs into the inside of the cup for upward and outward deflection into the granular filter bed, thus causing a rapid agitation or "boiling" of the granular bed.

Connected to the hub assembly and radiating outwardly therefrom in following relation to the jet manifold assemblies 29 are a plurality of rake assemblies 44. Each rake assembly 44 consists of a support arm 45 with a plurality of rods 46 connected thereto and extending downwardly therefrom and into the granular bed. These rake assemblies follow the jet manifold assemblies to level and smooth the granular filter bed after the bed cleaning operation of the jet manifold assemblies.

A suitable drive means is connected to the hub assembly for providing rotation to the hub assembly and its associated jet manifold assemblies 29 and the rake assemblies 44. One type of drive means is shown in the drawings and consists of a sprocket wheel 50 which is rigidly connected to the top of the hub assembly 27. A sprocket chain 51 connects the wheel 50 to a gear reducer 52 which is in turn driven by a drive motor 53 through a second sprocket chain 54.

A compressed air conduit 61 extends through the cleaned-gas compartment 13 and communicates with the interior of the hollow cylindrical casing 18. The conduit 61 delivers compressed air from a suitable compressed air source such as a blower 63 to the interior of the casing 18. The compressed air passes through the hollow sleeve bearing 24 and into the plenum chamber 30, thence through the pipe members 31 and through orifices 34 into jet tubes 40 for delivery to the granular filter bed 32.

In operation a granular filter material is placed on the bed support wall 6 to a level L to form the filter bed 32. The type of filter material depends on the intended use of the apparatus and may be any granular material such as sand or a man-made material. The depth of the material in the bed 32 may vary over a wide range depending on the intended use. A typical filter bed may consist of approximately 4 inches of No. 3 sandblast sand.

A continuous flow of dust laden gas enters the inlet compartment 12 through a gas inlet 14. The gas is dispersed over the entire exposed upper surface of the sand bed and flows down through the sand bed and the gas-permeable bed support wall 6 into the cleaned-gas outlet compartment 13. The downward flow of gas tends to compact the granular bed to form a firm bed which collects and holds the dust particles in a surface cake and/or tightly in the voids between the sand grains. This is true regardless of the velocity of the dirty gas since an increase in velocity will merely increase the compaction of the sand, thus aiding in the retention of dust particles. The gas after passing through the filter bed and giving up its entrained dust particles is discharged from outlet compartment 13 via gas outlet 15.

The dust which is deposited in the filter bed causes a build up in resistance through the bed and it then becomes necessary to purge or clean the filter bed and remove the deposited dust from the system. Cleaning the bed and removal of the deposited dust is accomplished by means of reverse gas flow through the bed. The reverse gas flow is a two-step process, one superimposed on the other. Flow of dust laden gas to the dirty-gas inlet compartment 12 is interrupted and a reverse flow of clean gas is produced by a reverse air fan communicating with the compartment 12 via purge gas outlet 16. Clean gas is drawn out of cleaned gas compartment 13 up through the filter bed 32 at a controlled velocity and exits through the purge gas outlet 16. This velocity is established at a value below the "boiling" point of the granular filter material but well within the fluidizing zone of the material. For a granular material such as sand, this value may be within the range of 100 to 120 cubic feet of gas per minute per square foot of bed area. This value will of course change with a change in the type of materials employed in the bed. This reverse gas flow is through the entire bed area and creates fluidization of the entire bed. This fluidization of the bed causes the bed to expand. With the bed in a fluidized and expanded state, the jet manifold assembly 29 may be rotated and the jet tubes 40 and the following rake assembly rods 46 can move through the granular filter material with little resistance. The individual particles of filter material are also free to move. As the jet manifold assembly rotates, compressed air is supplied from a blower 63 to the jet tubes 40 via the compressed air conduit 61, hollow sleeve bearing 24 and the pipe members 31. The orifices 34 in the pipe members 31 equalize the compressed air flow through the jet tubes 40 thereby insuring substantially constant flow from each of the jet tubes 40. The compressed air discharging from the jet tubes 40 is deflected by the cups 41 upward and outward through the granular filter bed 32 to produce a controlled agitation or "boiling" of the bed material to shake loose and release the deposited dust which has accumulated in the filter bed. The reverse gas flow produced by the reverse air fan combined with the compressed air from the jet tubes conveys the released dust particles out of the filter chamber.

After an area of the bed is cleaned by the violent agitation produced by the compressed air, the bed is leveled by means of the following rake assembly 44.

The foregoing description has been directed to a single chamber gas-solids separator to facilitate understanding the invention. In its preferred form, however, a plurality of such chambers are combined, either horizontally or vertically.

As can be seen more clearly in FIGS. 2 and 3, a plurality of identical filter units C1, C2, C3, C4 are combined in a vertical arrangement. Each unit consists of a separate filter chamber C with all the appurtenances as previously described. A dirty gas header 70 receives dust laden gas from a rotary kiln or other process through a main dirty gas conduit 69 and delivers it to dirty gas inlet conduits 71, 72, 73 and 74. The dirty gas inlet conduits 71, 72, 73 and 74 are provided with damper means 75, 76, 77 and 78 respectively. The dirty gas inlet conduits deliver dust laden gas to the respective inlet compartments 12 of each of the filter units via the inlet openings 14. The dust laden gas is sucked into the inlet compartments 12, down through the filter bed into the cleaned-gas compartment 13 and out through cleaned gas outlets 15 by means of a suction fan 101. The suction fan 101 communicates with the outlets 15 via a main discharge conduit 102, discharge header 103 and auxiliary discharge conduits 104, 105, 106 and 107.

The purge gas outlet 16 in each of the filter units C1, C2, C3 and C4 communicates with a reverse air header 80 via purge air conduits 81, 82, 83, and 84 respectively. The purge air conduits 81, 82, 83 and 84 are provided with damper means 85, 86, 87 and 88 respectively. The reverse air header 80 communicates with an auxiliary dust collector 100 via a conduit 89. The auxiliary dust collector 100 communicates via a conduit 111 with a reverse air fan 99.

A compressed air source such as a blower 63 delivers compressed air via a conduit 59, compressed air header 90 and compressed air conduits 91, 92, 93 and 94 to the respective compressed air conduits 61 in the filter units C1, C2, C3, and C4. The compressed air conduits 91, 92, 93 and 94 are provided with damper means 95, 96, 97 and 98, respectively.

The operation of a multiple unit gas-solids separator is basically the same as that for a single unit separator except for the timed sequence of the operation which can best be explained with reference to FIG. 3. As shown in FIG. 3 the unit C1 is in the filter bed cleaning phase while the units C2, C3 and C4 are in the gas cleaning phase. Damper 75 is closed thereby interrupting the flow of dust laden gas to the unit C1 while dampers 76, 77, and 78 are open thus admitting dust laden gas to pass through the units C2, C3 and C4. Damper 85 is open allowing clean reverse air to be drawn through the unit C1 and dampers 86, 87 and 88 are closed thus preventing reverse air flow to units C2, C3 and C4. Damper 95 is open allowing compressed air to enter unit C1 and dampers 96, 97, 98 are closed preventing compressed air flow to units C2, C3 and C4.

The reverse air fan 99 pulls clean reverse gas through the unit C1 and the compressed air blower 63 supplies compressed air to unit C1 for cleaning the filter bed. Liberated dust particles are discharged through conduit 89 to the auxiliary dust collector 100 where it is deposited and the conveying gas passes through the reverse air fan 99 and is discharged to atmosphere.

As can be readily seen from the foregoing description, each unit may be isolated in sequence from the inlet stream of dust laden gas by closing the appropriate damper 75, 76, 77 or 78, the gas being distributed to the remaining units in the system. Likewise, the reverse air flow and compressed air supply may be activated by a proper positioning of the appropriate dampers 85, 86, 87 and 88, and dampers 95, 96, 97 and 98 respectively An eletcric timer and stepping switch may be provided to automatically control the operation of each damper and motor to make the bed cleaning sequence automatic on a predetermined timed sequence.

It will also be appreciated that any desired number of units may be used and they may be arranged either in parallel gas flow or in series gas flow depending on the specific filtering operation.

The specific embodiments shown in the drawings and described above are for illustrative purposes only and are not intended to limit applicants' invention, the scope of which is embraced in the following claims.

We claim:

1. A gas-solids separator comprising a plurality of filter chambers, each of said filter chambers having a gas permeable support wall separating the filter chamber into a gas inlet compartment and a gas outlet compartment, a granular material disposed on said support wall within the gas inlet compartment and forming a filter bed, means for supplying a dirty gas to the inlet compartment of each of the filter chambers for passage from the inlet compartment through the filter bed to the outlet compartment of the chamber to which it is supplied to thereby clean the dirty gas and means for exhausting cleaned gas from the outlet compartment of each of the filter chambers, gas flow control means for selectively interrupting the flow of dirty gas to a given filter chamber while the remainder of the filter chambers are supplied with dirty gas, reverse flow means for selectively passing a flow of a clean gas through the filter bed of the given filter chamber to at least partially fluidize the filter bed, and agitating means for violently agitating localized areas of the filter bed of the given filter chamber when the filter bed is fluidized, said agitating means including a plurality of spaced apart jet tubes positioned along substantially the full extent of the filter bed, each of said jet tubes extending into the filter bed and terminating adjacent the support wall for selectively supplying compressed air upwardly into the filter bed.

2. The apparatus of claim 1 in which the agitating means further includes a compressed air manifold extending horizontally across the upper surface of the filter bed and said jet tubes extend downwardly from the manifold into the filter bed.

3. An apparatus according to claim 2 wherein each filter chamber comprises a cylindrical casing having a top wall and a bottom wall and said compressed air manifold is connected to a rotatable hub member, said hub member being connected to a suitable drive means for rotating the compressed air manifold around the entire area of the filter bed.

4. An apparatus according to claim 3 wherein said hub member is connected to a rotatable hollow sleeve bearing, said sleeve bearing extending vertically through the center of the filter bed and gas-permeable support wall and being mounted for rotation within a bearing support structure, said hollow sleeve bearing communicating at its lower end with a compressed air source and at its upper end with the compressed air manifold.

5. An apparatus according to claim 4 wherein a plurality of compressed air manifolds are connected to each hub member and extend radially therefrom across substantially the entire radius of the filter bed and at least one rake assembly is connected to the hub member and extends outwardly therefrom across the filter bed, said rake assembly consists of a plurality of rod members extending into the filter bed for leveling the bed.

6. An apparatus according to claim 4 wherein each of said jet tubes has a deflection cup mounted on its lower end for deflecting compressed air upwardly and outwardly into the filter bed.

7. An apparatus according to claim 6 wherein said jet tubes communicate with said manifold through equalizing orifices.

8. An apparatus according to claim 6 wherein dirty gas is supplied to the filter chambers from a dirty gas header, said header communicating with the gas inlet compartment of each filter chamber through a dirty gas conduit to thereby define said means for supplying dirty gas, each of said dirty gas conduits being provided with damper means for selectively interrupting the flow of dirty gas to a given filter chamber, and wherein said reverse flow means comprises a reverse air for communicating with the gas inlet compartment of each filter chamber through a plurality of reverse gas conduits, one for each filter chamber, said reverse gas conduits each having a damper means therein for selectively causing a reverse gas flow through a given filter chamber.

9. A gas-solids filter chamber, said filter chamber having a gas-permeable support wall separating the filter chamber into a gas inlet compartment and a gas outlet compartment, a granular material disposed on said support wall and forming a filter bed, means for passing a dirty gas into said gas inlet compartment and through the filter bed to said gas outlet compartment and gas flow control means for selectively interrupting the flow of dirty gas through the filter bed, reverse flow means for selectively passing a flow of clean gas through the filter bed during the interruption to at least partially fluidize the filter bed, and agitating means extending into the filter bed and terminating adjacent the surface of the support wall including means for selectively supplying compressed air upwardly into the filter bed at a plurality of points along substantially the full extent of the filter bed adjacent the surface of the support wall for violently agitating localized areas of the filter bed when the filter bed is fluidized.

10. An apparatus according to claim 9 in which the means for selectively supplying compressed air comprises a compressed air manifold extending horizontally across the upper surface of the filter bed and a plurality of jet tubes extending downwardly from the manifold into the filter bed for delivering compressed air thereto.

11. An apparatus according to claim 10 wherein the filter chamber comprises a cylindrical casing having a top wall and a bottom wall and said compressed air manifold is connected to a rotatable hub member, said hub member being connected to a suitable drive means for rotating the compressed air manifold around the entire area of the filter bed.

12. An apparatus according to claim 11 wherein said hub member is connected to a rotatable hollow sleeve bearing, said sleeve bearing extending vertically through the center of the filter bed and gas-permeable support wall and being mounted for rotation within a bearing support structure, said hollow sleeve bearing communicating at its lower end with a compressed air source and at its upper end with the compressed air manifold.

13. An apparatus according to claim 12 wherein a plurality of compressed air manifolds are connected to each hub member and extend radially therefrom across substantially the entire radius of the filter bed and at least one rake assembly is connected to the hub member and extends outwardly therefrom across the filter bed, said rake assembly consists of a plurality of rod members extending into the filter bed for leveling the bed.

14. An apparatus according to claim 13 wherein the jet tubes communicate with said manifold through equalizing orifices, each of said jet tubes having a deflection cup mounted on its lower end for deflecting compressed air upwardly and outwardly into the filter bed.

References Cited
UNITED STATES PATENTS

| | | | |
|---|---|---|---|
| 989,665 | 4/1911 | Tixier | 55—512UX |
| 2,309,916 | 2/1942 | Palmer | 210—272X |
| 2,534,600 | 12/1950 | Hutchings | 55—291X |
| 1,608,678 | 11/1926 | Smith | 55—474X |
| 2,717,694 | 9/1955 | Pansing et al. | 209—474X |
| 2,995,204 | 8/1961 | Prostshakov | 55—474X |
| 3,410,055 | 11/1968 | Zenz | 55—98X |

FOREIGN PATENTS

| | | |
|---|---|---|
| 1,063,015 | 8/1959 | Germany. |
| 2,241,243 | 5/1967 | Germany. |

FRANK W. LUTTER, Primary Examiner

V. H. GIFFORD, Assistant Examiner

U.S. Cl. X.R.

55—291, 294, 302, 474, 512; 210—273